US012654624B2

(12) United States Patent
Kovie

(10) Patent No.: US 12,654,624 B2
(45) Date of Patent: Jun. 16, 2026

(54) VEHICLE CARGO CARRIER

(71) Applicant: NISSAN NORTH AMERICA, INC.,
Franklin, TN (US)

(72) Inventor: David Kovie, Livonia, MI (US)

(73) Assignee: NISSAN NORTH AMERICA, INC.,
Franklin, TN (US)

( * ) Notice: Subject to any disclaimer, the term of this
patent is extended or adjusted under 35
U.S.C. 154(b) by 383 days.

(21) Appl. No.: 18/355,326

(22) Filed: Jul. 19, 2023

(65) Prior Publication Data

US 2025/0026277 A1      Jan. 23, 2025

(51) Int. Cl.
B60R 9/055 (2006.01)
B60J 5/10 (2006.01)
B62D 25/06 (2006.01)
(52) U.S. Cl.
CPC .............. B60R 9/055 (2013.01); B60J 5/102
(2013.01); B60J 5/106 (2013.01); B62D 25/06
(2013.01)
(58) Field of Classification Search
CPC ........... B60R 9/055; B60J 5/102; B60J 4/106;
B62D 25/06
See application file for complete search history.

(56) References Cited

U.S. PATENT DOCUMENTS

| | | | | |
|---|---|---|---|---|
| 4,084,735 A * | 4/1978 | Kappas | .................. | B60R 9/055 |
| | | | | 224/329 |
| 7,258,260 B2 * | 8/2007 | Hurd | ....................... | B60R 9/055 |
| | | | | 224/325 |
| 8,387,842 B2 * | 3/2013 | Elliott | ..................... | B60R 9/055 |
| | | | | 224/325 |
| 2006/0043130 A1 * | 3/2006 | Dabrowski | ............. | B60R 9/055 |
| | | | | 224/328 |
| 2007/0205240 A1 | 9/2007 | Castro et al. | | |
| 2011/0186608 A1 * | 8/2011 | Sautter | ................... | B60R 9/055 |
| | | | | 224/328 |
| 2013/0043287 A1 | 2/2013 | Hubbard et al. | | |
| 2014/0132022 A1 * | 5/2014 | Espig | .................... | B60J 7/1657 |
| | | | | 296/37.7 |
| 2015/0210221 A1 * | 7/2015 | Fritsche | .................. | B60R 9/055 |
| | | | | 224/328 |
| 2018/0283072 A1 * | 10/2018 | Laurent | .................... | B60J 5/106 |
| 2019/0202366 A1 * | 7/2019 | Amoriello | ............... | F04D 13/06 |
| 2022/0017018 A1 | 1/2022 | Perkins | | |

OTHER PUBLICATIONS

Thule, Pulse Rooftop Cargo Box, Amazon, Jul. 2023, USA.
Mopar Roof Box Cargo Carrier for All Jeeps, Just for Jeeps, Jul.
2023, USA.

* cited by examiner

*Primary Examiner* — Taras P Bemko
(74) *Attorney, Agent, or Firm* — Spencer Fane, LLP

(57) ABSTRACT

The present disclosure provides a vehicle, a vehicle roof
structure and a vehicle rooftop cargo carrier. In an embodi-
ment, the vehicle includes a vehicle body structure, a vehicle
roof rack assembly and a cargo carrier. The vehicle body
structure has a roof structure and a rear door opening. The
vehicle roof rack assembly is installed onto the roof struc-
ture. The cargo carrier is configured to be installed onto the
vehicle roof rack assembly. The cargo carrier has a base
attachable to the vehicle roof rack assembly. The cargo
carrier has a lid that is movable with respect to the base
between an open and an enclosed position. The base further
has a main body enclosable by the lid and an elongated
pocket that extends rearward with respect to the main body
and the lid.

20 Claims, 6 Drawing Sheets

VEHICLE CARGO CARRIER

BACKGROUND

Technical Field

The present disclosure generally relates to a vehicle cargo carrier. More specifically, the present disclosure relates to a vehicle cargo carrier having an elongated pocket.

Background Information

Vehicle cargo carriers are provided for additional storage external to the internal cargo area of the vehicle. Most vehicle cargo carriers are provided to a roof structure of the vehicle and can be installed to a vehicle roof rack assembly, such as to siderails and/or crossbars.

SUMMARY

In view of the state of the known technology, one aspect of the present disclosure is to provide a vehicle comprising a vehicle body structure, a vehicle body structure and a cargo carrier. The vehicle body structure has a roof structure and a rear door opening. The vehicle body structure is installed onto the roof structure. The cargo carrier is configured to be installed onto the vehicle roof rack assembly. The cargo carrier has a base attachable to the vehicle roof rack assembly. The cargo carrier has a lid that is movable with respect to the base between an open and an enclosed position. The base further has a main body enclosable by the lid and an elongated pocket that extends rearward with respect to the main body and the lid.

In view of the state of the known technology, another aspect of the present disclosure is to provide a vehicle roof structure comprising a vehicle roof rack assembly and a cargo carrier. The vehicle roof rack assembly is installed onto the roof structure. The cargo carrier is configured to be installed onto the vehicle roof rack assembly. The cargo carrier has a base attachable to the vehicle roof rack assembly. The cargo carrier has a lid that is movable with respect to the base between an open and an enclosed position. The base further has a main body enclosable by the lid and an elongated pocket that extends rearward with respect to the main body and the lid.

In view of the state of the known technology, another aspect of the present disclosure is to provide a vehicle rooftop cargo carrier comprising a base and a lid. The base is attachable to a vehicle roof rack assembly. The lid is movable with respect to the base between an open and an enclosed position. The base further has a main body and an opening enclosable by the lid and an elongated pocket that extends rearward with respect to the main body and the lid when the cargo carrier is installed to a vehicle. The elongated pocket is offset of the opening.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
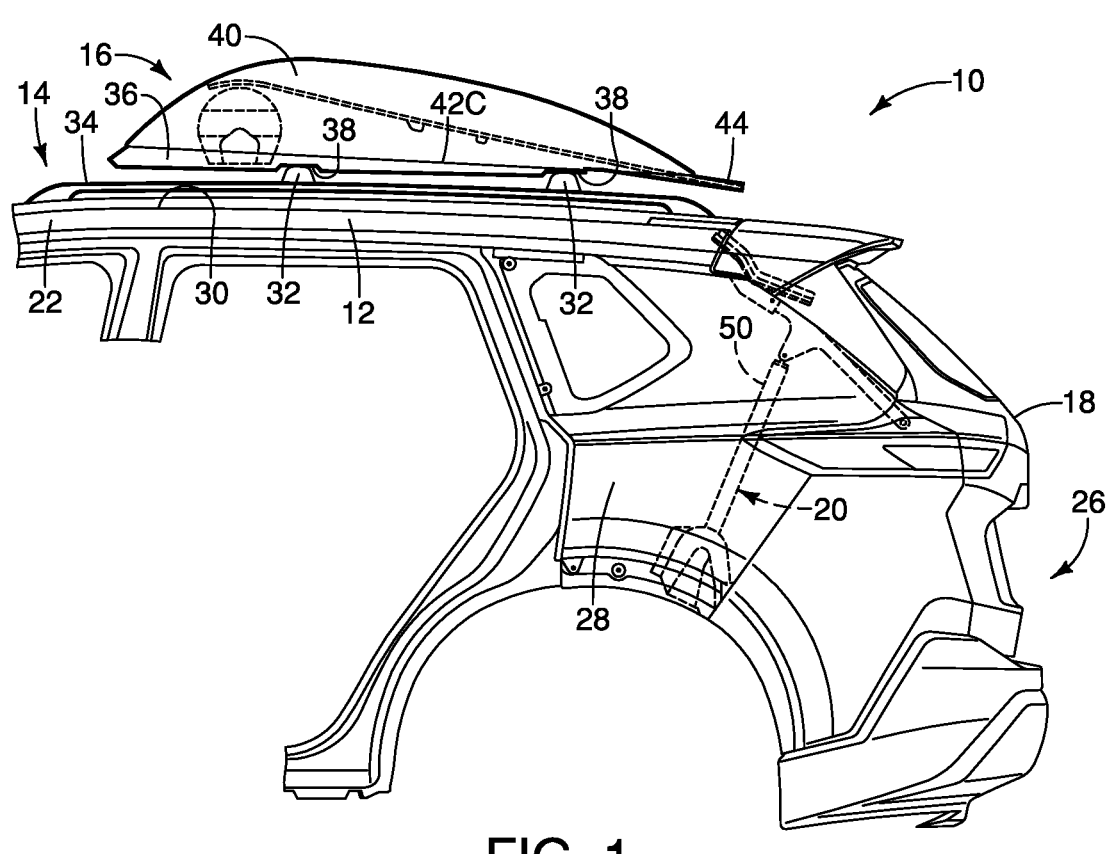
FIG. 1 is a side elevational view of a portion of a vehicle that is equipped with a cargo carrier and a rear door assembly of the illustrated embodiment.
Figure 2:
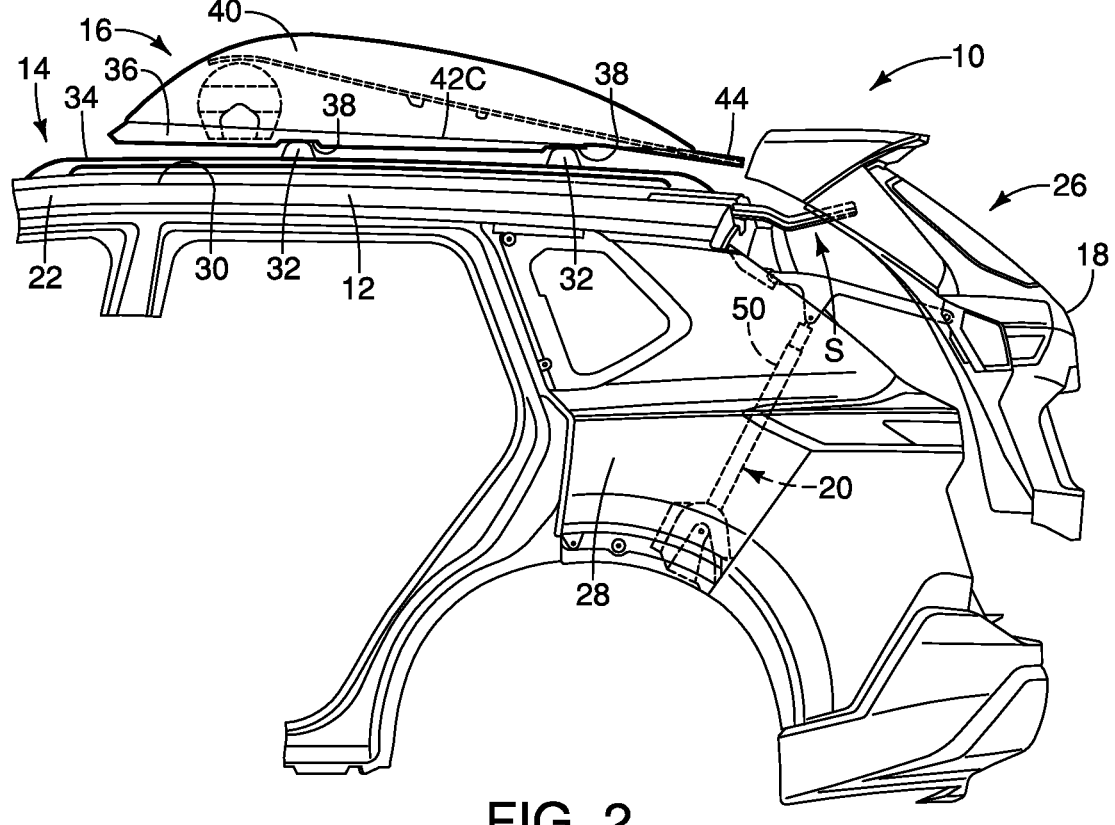
FIG. 2 is a side elevational view of the portion of the vehicle of FIG. 1 with the rear door assembly slightly opened.
Figures 3, 4:
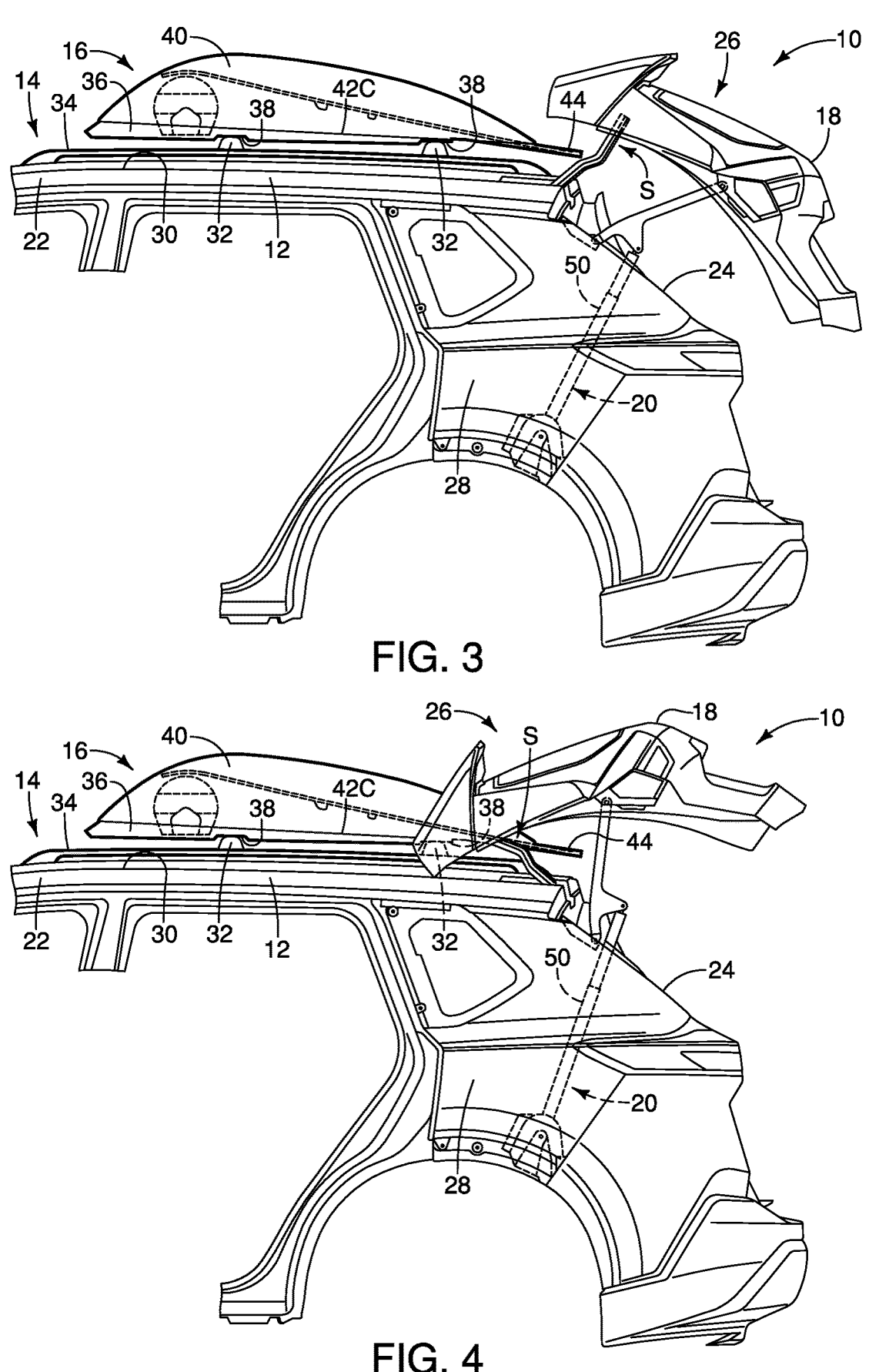
FIG. 3 is a side elevational view of the portion of the vehicle of FIG. 1 with the rear door assembly more opened.
FIG. 4 is a side elevational view of the portion of the vehicle of FIG. 1 with the rear door assembly fully opened.

Referring initially to FIGS. 1 to 3, a vehicle 10 is illustrated comprising a vehicle body structure 12, a vehicle roof rack assembly 14 and a cargo carrier 16 in accordance with an embodiment. As shown, the vehicle 10 further comprises a rear door 18 and a linkage assembly 20 movably supporting the rear door 18 between the door open orientation (FIG. 2) and the door closed orientation (FIG. 1).

As best seen in FIGS. 1 and 2, the vehicle body structure 12 has a roof structure 22 and a rear door opening 24. The vehicle body structure 12 further includes a rear end area 26 and a pair of vehicle body side walls 28 that together define the rear door opening 24. The rear end area 26 further defines the gutter areas and cavity opening for the vehicle 10. The rear end area 26 preferably includes a thick flexible seal (not shown) that is installed thereto that surrounds the rear door opening 24 to prevent water or debris entry into the vehicle 10.

Referring to FIGS. 4 to 7, the roof structure 22 includes a main panel 30 with roof ditches defined at either lateral side thereof. The main panel 30 is attached to respective upper ends of the side walls 28 along the roof ditch in a conventional manner. The roof ditches are recessed areas or troughs that extend from the front of the roof structure 22 to the rear end area 26 at each side of the main panel 30. The rear end area 26 can be a separate panel fixed to the panels that define the side walls 28 and the main panel 30 of the roof structure 22. Alternatively, the rear end area 26 can be formed as part of a rear end area 26 of each of the body side walls 28 and the main panel 30 of the roof structure 22.

As best seen in FIG. 4, the vehicle roof rack assembly 14 is installed onto the roof structure 22. The vehicle roof rack assembly 14 can include a pair of cross bars 32 extending along the roof structure 22. The vehicle roof rack assembly 14 further comprises a pair of siderails 34 that are installed to opposite lateral sides of the roof structure 22 or the main panel 30. The pair of siderails 34 extend longitudinally along a lengthwise direction of the roof structure 22. In the illustrated embodiment, the vehicle roof structure 22 comprises the vehicle roof rack assembly 14 that is installed onto the roof structure and the cargo carrier 16 of the illustrated embodiment.

As shown, the cross bars 32 extend laterally along the roof structure 22 between the siderails 34. That is, when the vehicle roof rack assembly 14 is installed onto the roof structure 22, the cross bars 32 extend laterally across the vehicle body structure 12 between the first and second siderails 34. Thus, while the cross bars 32 are illustrated as including a pair of cross bars 32, it will be apparent to those skilled in the vehicle field from this disclosure that the cross bars 32 can include a single crossbar or additional cross bars 32, as needed and/or desired.

The siderails 34 are preferably each a rigid bar having retention channels(s) extending along a longitudinal length of the siderails 34. The cross bars 32 are retained in the retention channels of the siderails 34 in a conventional manner. In the illustrated embodiment, the siderails 34 and the cross bars 32 are conventional and will not be further discussed. The cross bars 32 can be installed onto siderails 34 using fasteners (e.g., bolts, screws, and the like) to secure the cross bars 32 to the siderails 34. Alternatively, it will be apparent to those skilled in the vehicle field from this disclosure that the cross bars 32 can be directly attached to the vehicle roof structure 22 without siderails 34 and by other means.

Figure 5:
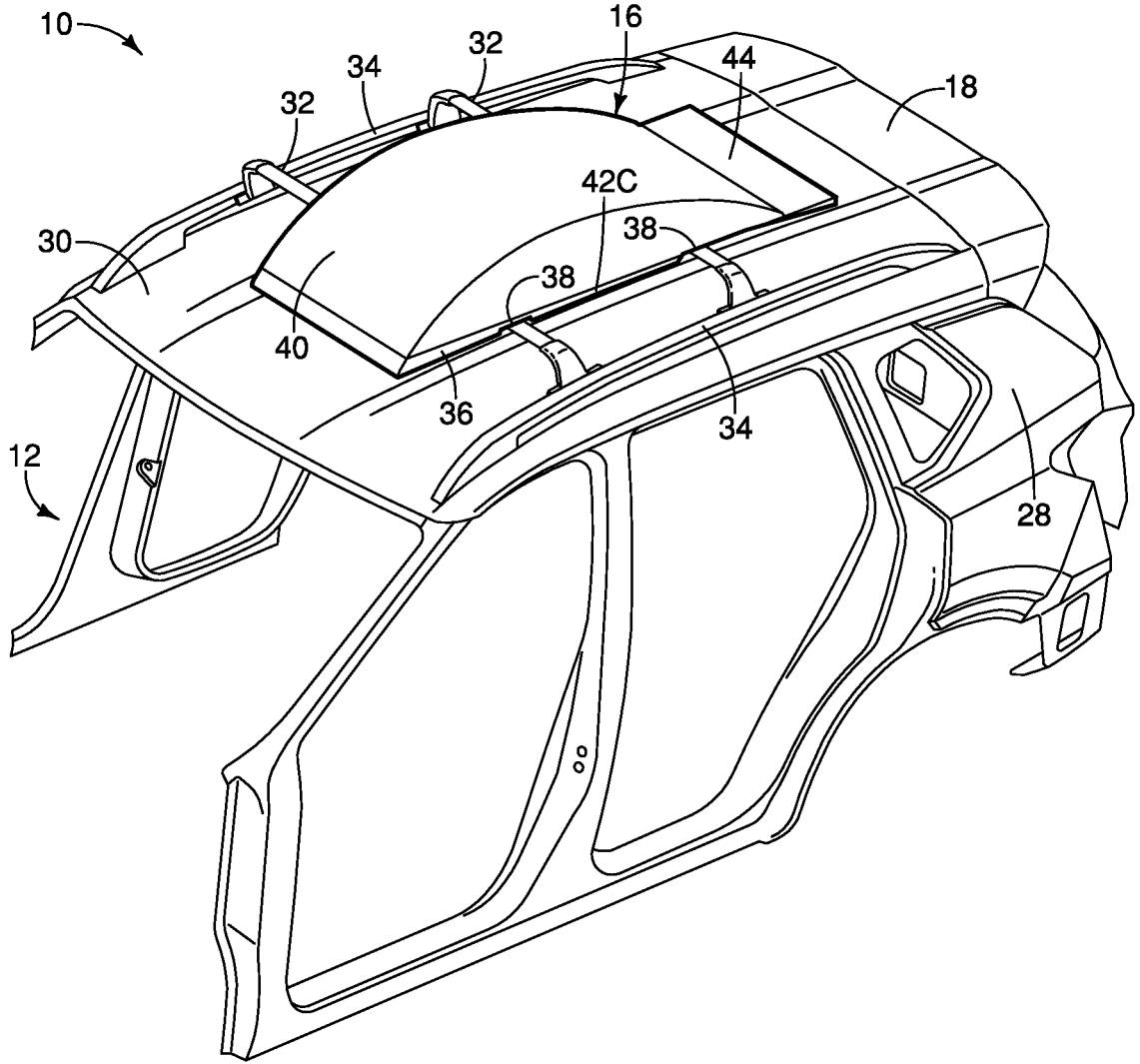
FIG. 5 is a top perspective view of a vehicle body structure of the vehicle equipped with the cargo carrier.
Figure 6:
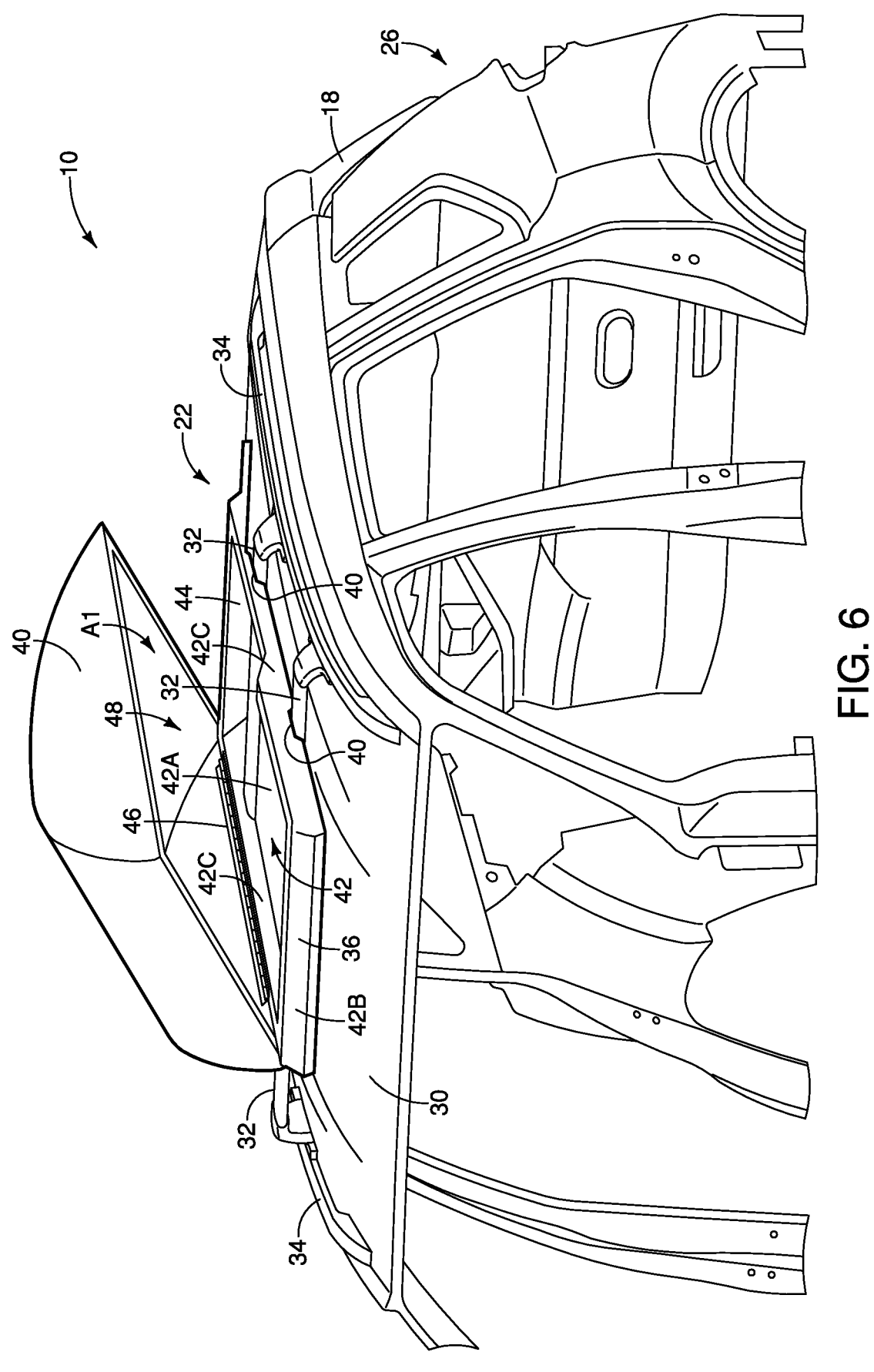
FIG. 6 is a front perspective view of the vehicle body structure of FIG. 4 but with the cargo carrier in an open orientation.

In the illustrated embodiment, the cargo carrier 16 includes one or more attachment structures for removably attaching the cargo carrier 16 to the cross bars 32. Therefore, the cargo carrier 16 is configured to be installed onto the vehicle roof rack assembly 14. That is, the cargo carrier 16 is provided to be attached to the cross bars 32 of the vehicle 10, as will be further discussed below. Preferably, the cargo carrier 16 can be removably attached to the cross bars 32 or to other components of a vehicle roof rack assembly 14. That is, the cargo carrier 16 can alternatively be configured to be installed onto the siderails 34 of the vehicle roof rack assembly 14. In the illustrated embodiment, the attachment structures include grooves 36 and indentations in the cargo carrier 16 that accommodate and receive the cross bars 32, as best seen in FIGS. 5 and 6. It will be apparent to those skilled in the vehicle field from this disclosure that the attachment structures can be modified to accommodate different types of vehicle roof rack assemblies.

As shown in FIGS. 1 and 2, the rear door 18 is movable between the door closed orientation covering the rear door opening 24 and the door open orientation exposing the rear door opening 24. The vehicle rear door 18 is movable with respect to the vehicle body by the linkage assembly 20. As shown in FIG. 1, with the rear door 18 in the door closed orientation, the rear door 18 covers and at least partially conceals a cargo area at the rear of the vehicle body structure 12. As shown in FIG. 2, with the rear door 18 in the door open orientation, the rear door 18 exposes and allows easy access to the cargo area at the rear end area 26 of the vehicle body structure 12. The linkage assembly 20 supports the rear door 18 for kinematic movement between the closed orientation and the open orientation. Particularly, the linkage assembly 20 supports the rear door 18 such that with the rear door 18 in the open orientation the rear door 18 is located even with or forward of the rearward most area of a bumper fascia of the vehicle 10 as best seen in FIG. 3. The linkage assembly 20 will be further discussed below.

The cargo carrier 16 can be designed and dimensioned to have drag-reducing structure(s) and features. For example, as best seen in FIG. 4, the cargo carrier 16 is shaped to reduce drag and encourage streamlined travel and reduce noise during travel. The cargo carrier 16 is preferably made of any suitable material configured to eliminate, restrict, and/or deflect airflow around the carrier or between the carrier and the vehicle 10. For example, the cargo carrier 16 can be made using semi-rigid materials, cloth, hard plastic, soft foam materials, and/or any other suitable material for reducing drag.

The cargo carrier 16 can additionally include any suitable shapes, dimensions or structures configured to reduce drag and/or noise from the airflow over or under cargo carrier 16 when the vehicle 10 is moving, including both air traveling over the top and around the sides of the cargo carrier 16, and air traveling between the bottom of the carrier and the roof structure 22 of the vehicle 10. For example, the cargo carrier 16 can include at least one air dam or fairing configured to be mounted to the vehicle cargo carrier 16 and/or to the cross bars 32 of the vehicle roof rack assembly 14. The drag-reducing structure can reduce drag and/or noise by eliminating, restricting, and/or deflecting the flow of air around the carrier, particularly between the cargo carrier 16 and the roof structure 22 of the vehicle 10.

Figure 7:
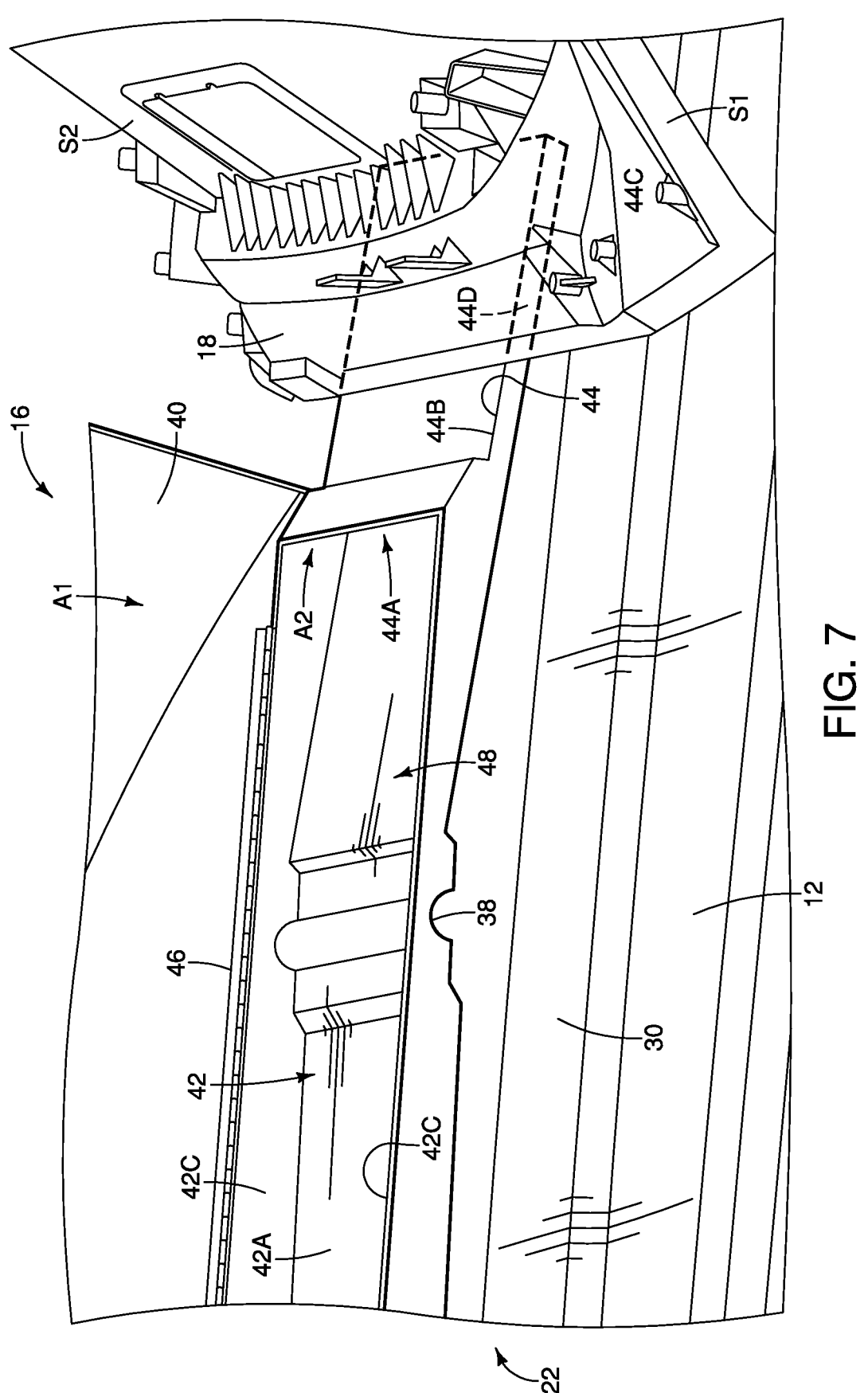
FIG. 7 is an enlarged perspective view of the cargo carrier in the open orientation.

In the illustrated embodiment, the cargo carrier 16 can be mounted on the siderails 34 and/or the cross bars 32 via any suitable methods and fasteners, such as with one or more clamps, snaps, screws, bolts, adhesives, etc. The cargo carrier 16 has a base 36 attachable to the vehicle roof rack assembly 14. As best seen in FIG. 7, the base 36 can include a pair of grooves 36 that act as receptacles for corresponding to and receiving the cross bars 32 therein. Further, the base 36 can additionally be provided with attachment mechanisms such as clamps specifically configured to conveniently attach to common sizes and shapes of roof rack cross bars 32, or to common vehicle top carriers.

Furthermore, the cargo carrier 16 can include any suitable structure configured to allow the cargo carrier 16 to be supported vertically or horizontally on the vehicle roof structure 22 or other suitable location. For example, the cargo carrier 16 can include a loop of cable or rope, a flip out metal or plastic loop, etc. to secure the cargo carrier 16 to the roof rack assembly 14. Alternatively, the cargo carrier 16 can be equipped with clamps that grip the cross bars 32 of the vehicle roof rack that can also be used to engage the siderails 34, thus providing a stable storage mechanism for the carrier cargo. As stated, it will be apparent to those skilled in the vehicle field from this disclosure that the base 36 can be modified to have different types of grooves 36, indentations or attachment mechanisms to attach the base 36 to different types of cross bars 32 and/or to the siderails 34.

Figure 8:
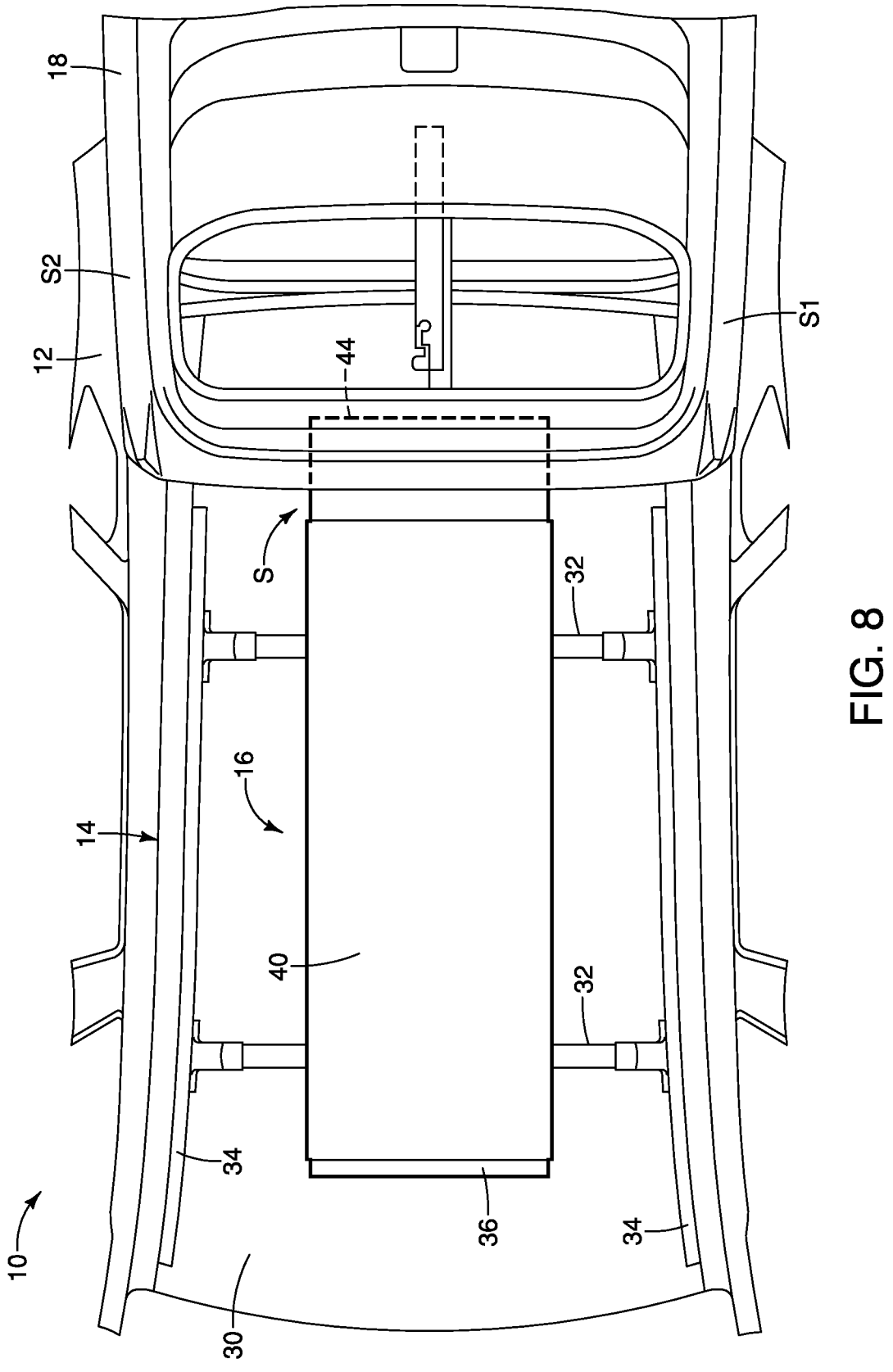
FIG. 8 is a top plan view of the vehicle equipped with the cargo carrier.

As shown in FIGS. 5 and 6, the cargo carrier 16 has a lid 40 that is movable with respect to the base 36 between an open and an enclosed position of the cargo carrier 16. The base 36 further has a main body 42 enclosable by the lid 40 and an elongated pocket 44 that extends rearward on the roof structure 22 with respect to the main body 42 and the lid 40. The main body 42 includes the attachment structures for attaching the cargo carrier 16 to the roof rack assembly 14. The main body 42 includes a bottom wall 42A, a front wall 42B and a pair of sidewalls 42C that together help define an interior A1 of the main body 42 with the lid 40. The interior of the main body 42 is connected to an interior A2 of the elongated pocket 44, as best seen in FIG. 8. The interior A1 of the main body 42 and the interior A1 of the elongated body together define an overall interior A of the cargo carrier 16. The cargo carrier 16 includes a hinge 46 that movably attaches the lid 40 to the base 36. The hinge 46 is preferably a piano hinge or a continuous hinge made of aluminum, steel or stainless steel.

Referring to FIGS. 6 and 7, the base 36 includes an opening 48 accessible to the interior of the main body 42 where items can be stored. The opening 48 extends across the main body 42 of the base 36. The opening 48 stops at the enclosed pocket such that the enclosed pocket does not include the opening 48. In other words, the opening 48 is offset of the elongated pocket 44 of the base 36. Preferably, as best seen in FIG. 6, the main body 42 is raised with respect to the elongated pocket 44. The elongated pocket 44 includes a floor panel 44A, a top panel 44B, a rear wall 44C and a pair of sidewalls 44D. In the illustrated embodiment, the sidewalls 42C of the main body 42 are raised with respect to the sidewalls 44D of the elongated pocket 44. In this way, the elongated pocket 44 is flattened with respect to the main body 42 so that the elongated pocket 44 can extend between a space S between the rear door 18 and the roof structure 22 when the rear door 18 is opened. The sidewalls 42C of the main body 42 are also positioned to accommodate the roof rack assembly 14, as shown.

As shown, the length of the cargo carrier 16 extends perpendicularly to the cross bars 32 once installed to the roof structure 22. The cargo carrier 16 preferably includes a latch (not shown) that maintains the lid 40 in the enclosed position and can be operated to allow opening 48 when desired. The latch can be provided with a key, combination operated, and/or any suitable lock mechanism.

As stated, the linkage assembly 20 movably supports the rear door 18 with respect to the vehicle body between the open and closed orientations. As best seen in FIG. 2, the linkage assembly 20 has a first linkage 50 supporting the rear door 18 at a first lateral side S1 of the rear door 18. The linkage assembly 20 has a second linkage 50 supporting the rear door 18 at a second lateral side S2 of the rear door 18. The first and second linkages 50 are identical except for being mirror images of each other. The first linkage 50 includes a rearward member, a forward member and an extender. The second linkage 50 includes an identical configuration that is mirror image of the first linkage 50.

With the linkage assembly 20, when the rear door 18 is moving from the closed orientation to the open orientation, the lower end of the rear door 18 moves rearward of an imaginary vertical plane located at a rearward most point of the bumper fascia by less than 8 inches and preferably only six (6) inches. Consequently, a person standing only eight (8) inches and preferably six (6) inches rearward of the imaginary vertical plane at the bumper fascia will not be contacted by a bottom edge of the rear door 18 during movement of the rear door 18 to the open orientation. In the absence of the linkage assembly 20 where a rear door 18 pivots only about conventional door hinges, the rear door 18 will often swing rearward of the bumper fascia by more that a foot or a foot and a half, depending upon the size of the door and the location of the hinges.

Therefore, one advantage of the rear door 18 having the linkage assembly 20 is that less space is needed rearward of the vehicle 10 in order to open the rear door 18. In other words, the rear door 18 can open with minimal rearward movement during the door opening 48 and closing processes. The cargo carrier 16 of the illustrated embodiment is compatible with the rear door 18 and the linkage assembly 20 to enable expanded storage in the cargo carrier 16 while still being compatible with the rear door 18.

Referring now to FIGS. 1, 2, 6 and 7, the rear door 18 is positioned over (above) the elongated pocket 44 of the base 36 when in the door open orientation (FIGS. 2 and 3). The rear door 18 is positioned rearward of (behind) the elongated pocket 44 when in the door closed orientation (FIG. 1). The elongated pocket 44 extends in the space between the first and second lateral sides S1 and S2 when the rear door 18 is in the door open orientation. The linkage assembly 20 supports the rear door 18 at a location above the elongated pocket 44 when the rear door 18 is in the door open orientation. In particular, the elongated pocket 44 extends between the first and second linkages 50 when the rear door 18 is in the door open orientation. In this way, long objects (e.g., skis) can be stored in the cargo carrier 16 inside the main body 42 and extending into the elongated pocket 44. That is, the elongated pocket 44 is provided for storage of elongated objects such as skiing equipment and the like while enabling the cargo carrier 16 to be stored on the vehicle 10 having a compactly opening 48 rear door 18.

In understanding the scope of the present invention, the term "comprising" and its derivatives, as used herein, are intended to be open ended terms that specify the presence of the stated features, elements, components and/or groups, but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle cargo carrier. Accordingly, these terms, as utilized to describe the present invention should be interpreted relative to a vehicle equipped with the vehicle cargo carrier.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle comprising:
a vehicle body structure having a roof structure and a rear door opening;
a vehicle roof rack assembly installed onto the roof structure; and
a cargo carrier configured to be installed onto the vehicle roof rack assembly, the cargo carrier having a base attachable to the vehicle roof rack assembly, the cargo carrier having a lid that is movable with respect to the base between an open position and an enclosed position, the base further having a main body enclosable by the lid and an elongated pocket that extends rearward with respect to the main body and the lid, the main body including a main body bottom wall and at least one main body side wall which form a bottom interior space having a vertical height and accessed by an upper opening, the lid including a lid top wall and at least one lid side wall which form a top interior space, the lid movably attached to the base by a hinge so as to reveal the upper opening when in the open position and to enclose a main interior space including the top interior space and the bottom interior space when in the enclosed position, and the elongated pocket including at least a pocket bottom wall and a pocket top wall that enclose a rear interior space that opens into the bottom interior space within the main body, the rear interior space having less vertical height than the bottom interior space.

2. The vehicle according to claim 1, further comprising a rear door movable between a door closed orientation covering the rear door opening and a door open orientation exposing the rear door opening, the rear door being positioned over the elongated pocket of the base when in the door open orientation, the rear door being positioned rearward of the elongated pocket when in the door closed orientation.

3. The vehicle according to claim 2, further comprising a linkage assembly movably supporting the rear door between the door open orientation and the door closed orientation, the linkage assembly supporting the rear door at a location above the elongated pocket when the rear door is in the door open orientation.

4. The vehicle according to claim 3, wherein the linkage assembly has a first linkage supporting the rear door at a first lateral side of the rear door and a second linkage supporting the rear door at a second lateral side of the rear door, the elongated pocket extending in a space between the first and second lateral sides when the rear door is in the door open orientation.

5. The vehicle according to claim 2, wherein the vehicle roof rack assembly includes a pair of cross bars extending along the roof structure, the main body of the base includes attachment structures for removably attaching the cargo carrier to the cross bars.

6. The vehicle according to claim 1, wherein the upper opening being of the main body is offset from the elongated pocket in a forward direction of the vehicle.

7. The vehicle according to claim 1, wherein the at least one side wall of the main body is raised with respect to the elongated pocket.

8. The vehicle according to claim 1, further comprising the at least one main body side wall includes a front side wall and a lateral side wall, and the hinge is located along the lateral side wall.

9. A vehicle roof structure comprising:

a vehicle roof rack assembly; and a cargo carrier configured to be installed onto the vehicle roof rack assembly, the cargo carrier having a base attachable to the vehicle roof rack assembly, the cargo carrier having a lid that is movable with respect to the base between an open position and an enclosed position, the base further having a main body enclosable by the lid and an elongated pocket that extends rearward with respect to the main body and the lid, the main body including a main body bottom wall and at least one main body side wall which form a bottom interior space having a vertical height and accessed by an upper opening, the lid including a lid top wall and at least one lid side wall which form a top interior space, the lid movably attached to the base by a hinge so as to reveal the upper opening when in the open position and to enclose a main interior space including the top interior space and the bottom interior space when in the enclosed position, and the elongated pocket including at least a pocket bottom wall and a pocket top wall that enclose a rear interior space that opens into the bottom interior space within the main body, the rear interior space having less vertical height than the bottom interior space.

10. The vehicle roof structure according to claim 9, wherein the vehicle roof rack assembly includes a pair of cross bars, the main body of the base includes attachment structures for removably attaching the cargo carrier to the cross bars.

11. The vehicle roof structure according to claim 9, wherein the upper opening of the main body is offset from the elongated pocket in a forward direction.

12. The vehicle roof structure according to claim 9, wherein the at least one side wall of the main body is raised with respect to the elongated pocket.

13. The vehicle roof structure according to claim 9, wherein the at least one main body side wall includes a front side wall and a lateral side wall, and the hinge is located along the lateral side wall.

14. A vehicle rooftop cargo carrier comprising:

a base attachable to a vehicle roof rack assembly; and a lid that is movable with respect to the base between an open position and an enclosed position, the base further having a main body with an upper opening enclosable by the lid and an elongated pocket that extends rearward with respect to the main body and the lid when the cargo carrier is installed to a vehicle, the elongated pocket being offset of the upper opening, the main body including a main body bottom wall and at least one main body side wall which form a bottom interior space having a vertical height and accessed by the upper opening, the lid including a lid top wall and at least one lid side wall which form a top interior space, the lid movably attached to the base by a hinge so as to reveal the upper opening when in the open position and to enclose a main interior space including the top interior space and the bottom interior space when in the enclosed position, and the elongated pocket including at least a pocket bottom wall and a pocket top wall that enclose a rear interior space that opens into the bottom interior space within the main body, the rear interior space having less vertical height than the bottom interior space.

9

10

15. The vehicle rooftop cargo carrier according to claim 14, wherein
the main body of the base includes attachment structures for removably attaching the cargo carrier to the cross bars.

16. The vehicle rooftop cargo carrier according to claim 14, wherein
the upper opening of the main body of the base is raised with respect to the elongated pocket.

17. The vehicle rooftop cargo carrier according to claim 14, wherein
the at least one side wall of the main body is raised with respect to the elongated pocket.

18. The vehicle rooftop cargo carrier according to claim 14, wherein
the at least one main body side wall includes a front side wall and a lateral side wall, and
the hinge is located along the lateral side wall.

19. The vehicle rooftop cargo carrier according to claim 14, wherein
the at least one lid side wall includes a front side wall and a lateral side wall, and
the hinge is located along the lateral side wall.

20. The vehicle rooftop cargo carrier according to claim 14, wherein
the base decreases in height towards a front side of the vehicle to form a drag-reducing structure.

* * * * *